United States Patent [19]
Bok et al.

[11] 3,746,139
[45] July 17, 1973

[54] FRICTION DISC MEMBER FOR BRAKE OR CLUTCH

[75] Inventors: Lowell D. Bok, Anna; Arthur J. Thrower, Troy, both of Ohio

[73] Assignee: The B. F. Goodrich Company, New York, N.Y.

[22] Filed: July 19, 1971

[21] Appl. No.: 163,924

[52] U.S. Cl. ...... 192/107 R, 188/73.2, 188/218 XL
[51] Int. Cl. ............................................. F16d 13/60
[58] Field of Search .................. 192/107 R, 107 M; 188/218 XL, 73.2, 264 A, 264 AA

[56] References Cited
UNITED STATES PATENTS
2,767,817  10/1956  Davis ................................. 192/107
3,452,844  7/1969  Lallemant ..................... 188/218 XL
3,483,953  12/1969  Bender ........................... 192/107 R Primary Examiner—Charles J. Myhre
Assistant Examiner—Randall Heald
Attorney—John D. Haney et al.

[57] ABSTRACT

An annular plate of heat sink material having a plurality of friction lining segments on opposite faces for frictional engagement with other brake parts. Clamping members are fastened to the annular plate between the segments and have circumferentially extending arms in overlapping relation with the friction lining segments for holding them in position and protecting the annular plate.

3 Claims, 5 Drawing Figures

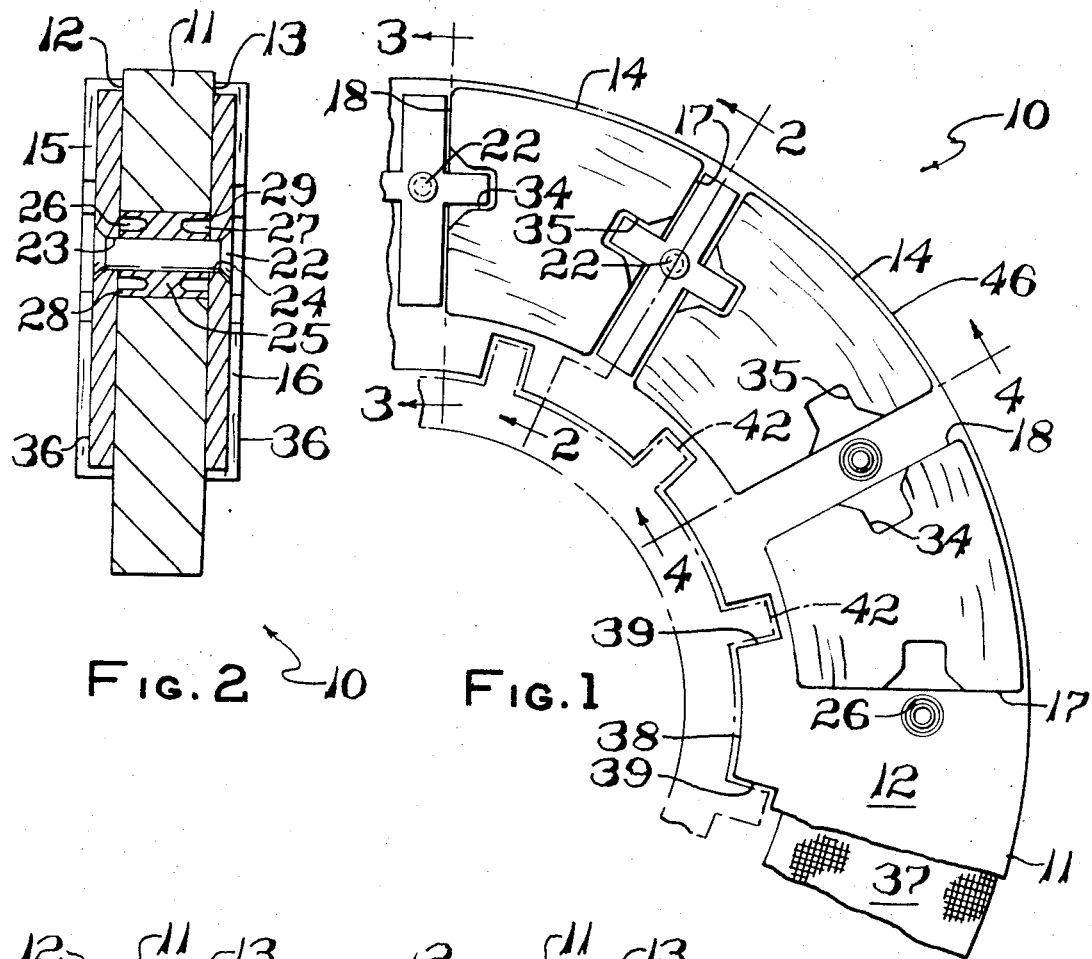
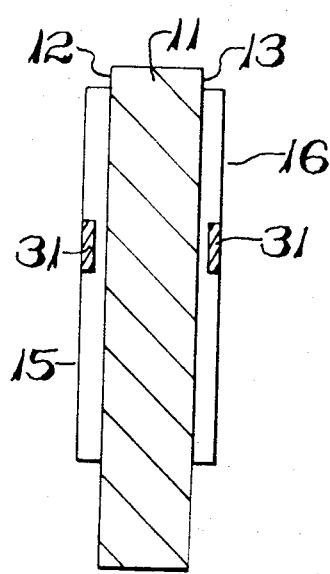
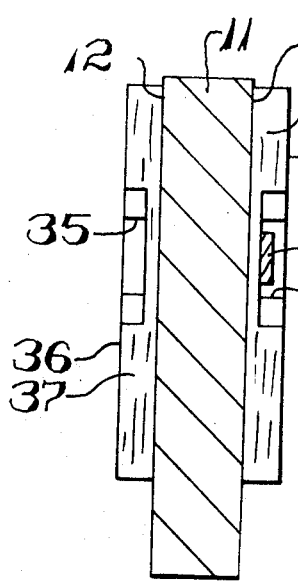
INVENTORS
LOWELL D. BOK
ARTHUR J. THROWER
BY John D. Haney
ATTY.

3,746,139

FRICTION DISC MEMBER FOR BRAKE OR CLUTCH

BACKGROUND OF THE INVENTION

This invention relates to disc type brakes or clutches and particularly to the annular friction disc members which engage other friction disc member during operation of the brake or clutch. Friction disc members used in the brakes of high performance aircraft must absorb great quantities of heat during operation and must also be able to withstand the high temperatures which result from the braking operation. The heat absorbing capacity has been obtained by using heat absorbing material such as beryllium; however, because of the high cost of this material, a friction lining material is needed for engagement with other rotating brake parts.

The friction lining material used in brakes of this type must also withstand high temperatures, have good wearing characteristics and a low density to meet the weight and space requirements of modern aircraft. It is also desirable to mount the friction lining material on the friction disc members so that it may be replaced without requiring replacement of the complete disc.

The friction lining material may be in segments which are mounted at circumferentially spaced-apart positions around the faces of the friction disc member; however, provisions must be made to transmit the torque from the friction lining material segments to the disc member and also to resist the rotation of the segments which may occur due to the forces on the segments during frictional engagement with other rotating brake members.

Because of the high cost of the heat sink material used in the friction disc members and the possibility that the friction lining material may deteriorate or be worn away exposing the heat sink material, it is also important that provisions be made to protect the heat sink material from engagement with the other rotating parts of the brake.

SUMMARY OF THE INVENTION

According to this invention, segments of carbon friction lining material which has good wear properties and a low density and can withstand exceedingly high temperatures are mounted on the friction disc faces for frictional engagement with other rotating brake parts. The mounting means used provides a large bearing area in engagement with the radial edges of the friction lining segments which are held in a manner resisting rotation of the segments during operation of the brake. The mounting means also includes a clamp between each segment which is in solid contact with the structural annular disc member of heat sink material and in overlapping relationship with the friction lining material. The clamping member not only clamps the friction lining material against the disc member but also provides a protective body preventing engagement of the heat sink material with other rotating brake parts. The clamping body is easily removable to provide for replacement of the friction lining material without necessitating replacement of the complete friction disc member. The transfer of torque from the friction lining material to the annular disc member is accomplished without imposing undue stress on the friction lining material or the disc member itself.

The accompanying drawings show one preferred form made in accordance with and embodying this invention and which is representative of how this invention may be practiced.

BRIEF DESCRIPTION OF THE DRAWINGS

In the drawings:

FIG. 1 is a side elevation of a part of an annular disc assembly (shown in solid lines), certain parts being broken away and illustrated in torque driving engagement with a related part which in this example may be a splined torque tube, the sides of which are represented by the chain-dotted lines;

FIG. 2 is an enlarged sectional view taken along the plane of line 22 of FIG. 1;

FIG. 3 is a sectional view taken along the plane of line 33 of FIG. 1;

FIG. 4 is a sectional view taken along the plane of line 44 of FIG. 1;

FIG. 5 is a perspective view of the clamping member shown in FIG. 1.

DETAILED DESCRIPTION

Referring to FIG. 1, a friction disc assembly 10 is shown which has an annular rigid disc member 11 with opposing faces 12 and 13 on which sector-shaped segments 14 of friction lining material are clamped by clamping members 15 and 16. The segments 14 of friction lining material are disposed at circumferentially spaced-apart positions around the disc member 11 and have radially extending edges 17 and 18. Between the radially extending edges 17 and 18 of adjacent segments 14, longitudinal members 21 of the clamping members 15 and 16 are mounted in close fitting relationship with the edges of the segments. The clamping members 15 on one side of the disc member 11 are in alignment with the clamping members 16 on the other side of the disc member and are fastened together by suitable means such as rivets 22 extending through the disc member 11 and holes 23 and 24 in the clamping members 15 and 16 where the rivets may be upset in securely fastened positions. A sleeve 25 surrounds each of the rivets 22 as it passes through the disc member 11 for distributing the stresses and transferring the torque from the clamping members 15 and 16 to the disc member 11 during operation of the brake. The sleeve 25 may be of wear-resistant material such as steel and may have annular grooves 26 and 27 in the opposing faces providing flexible edges 28 and 29 for better distribution of the stresses transmitted from the segments 14 of friction lining material.

Circumferentially extending transverse arms 30 and 31 of the clamping members 15 and 16 extend circumferentially and outwardly from the longitudinal members 21 of the clamping members in overlapping relationship with the segments 14 of friction lining material at a position approximately halfway between the inner and outer peripheries. The segments 14 may be undercut at the surface to provide grooves 34 and 35 for receiving the arms 30 and 31 of the clamping members 15 and 16. Preferably, the depth of the grooves 34 and 35 is greater than the thickness of the arms 30 and 31 so that the clamping member will not engage the friction surface 36 of the segments 14 during normal operation. In the preferred form shown in the drawings, one pair of clamping members 15 and 16 are shown in a position approximately halfway between the inner and outer peripheries of the segments 14. In other embodiments of the invention it may be desirable to locate the clamping members 15 and 16 at different radial positions and it may also be desirable to have more than one pair of clamping members between two adjoining segments 14. Furthermore, the number of arms 30 and 31 may be increased for each of the clamping members 15 and 16 from one for each clamping member to two or more.

In the embodiment shown the segments 14 of friction lining material are of a hard, durable friction disc such as carbon material made from pyrolized graphite cloth 37 having a friction surface of graphite which may also be of a pyrolized resin or other material. This carbon friction lining material is highly resistant to high temperatures and provides good wear properties. It is also a material of low density and meets the weight requirements of a high energy aircraft brake.

The disc member 11 is of a heat sink material having the quality of absorbing large quantities of heat during the braking operation. Beryllium has been found to be a suitable material and is the material used in the embodiment shown. This construction may be adapted for use as a rotor or stator and in the present embodiment the inner periphery 38 of the disc member 11 has spaced-apart axially extending grooves 39 for engagement with mating interfitting splines 42 of an associated torque tube which is represented in chain-dotted lines. It can be seen that where this invention is to be applied to a rotor, the axially extending grooves may be provided in the outer periphery 46 for engagement with interfitting ribs on a wheel.

With the construction shown in the drawings, the friction disc assembly may be manufactured with a minimum of cost in that the opposing clamping members 15 and 16 are riveted to opposite faces 12 and 13 of the disc member 11 with the arms 30 and 31 in overlapping relationship in the grooves 34 and 35 of the segments 14.

In operation, the friction surface 36 engages the surface of another braking member, not shown, and the torque is transmitted from the friction surface through the body of graphite cloth 37 to the radially extending edges 17 and 18 which abut the edges of the longitudinal members 21 of the clamping members 15 and 16. The longitudinal members 21 which fill the gaps between the segments 14 prevent rotation of the segments and convey the torque forces through the rivets 22 and the sleeves 25 to the disc member which is in torque transmitting engagement with the torque tube 41.

When the friction surface 36 is worn, the segments 14 may be replaced by drilling out the rivets 22 and removing the clamping members 15 and 16 from the opposite faces 12 and 13 of the disc member.

With this construction made up principally of lightweight beryllium and lightweight carbon segments, a highly effective heat absorbing and heat resistant disc assembly is provided which takes out a minimum of space for the quantity of heat absorbed and has a very low density to meet the weight requirements for a high performance aircraft.

We claim:

1. A friction member for a brake or clutch comprising an annular rigid disc member, sector-shaped friction lining segments with radially extending edges positioned at circumferentially spaced-apart positions on the face of said rigid member, radially extending longitudinal clamping members fastened to said rigid member in the spaces between said segments, each of said clamping members having radially extending edges abutting said radially extending edges of said lining segments along substantially the radial length of said lining segments, said clamping members having transverse arms extending circumferentially from said radially extending edges of said longitudinal clamping members at positions spaced from the face of said rigid member in overlapping relation with said segments to positions spaced from said radially extending edges of said clamping members whereby said segments are held against rotation and in torque transmitting relation with said annular rigid member.

2. A friction member according to claim 1 wherein said lining segments are undercut providing circumferentially extending grooves for receiving said arms transverse and the depth of said grooves being greater than the thickness of said arms whereby the arms will not engage a friction surface of another brake member in frictional engagement with said lining segments during operation.

3. A friction member for a brake or clutch comprising an annular rigid disc member of beryllium, friction lining segments of graphite with a graphite cloth backing positioned at circumferentially spaced-apart positions on the face of said rigid member, clamping members fastened to said rigid member in the spaces between said segments, said clamping members having arms in overlapping relation with said segments whereby said segments are held against rotation and in torque transmitting relation with said annular rigid member.

* * * * *